(12) United States Patent
Backes et al.

(10) Patent No.: US 8,009,016 B2
(45) Date of Patent: Aug. 30, 2011

(54) TAG IDENTIFICATION SYSTEM

(75) Inventors: Michael Backes, Rentrisch (DE);
Thomas R. Gross, Zurich (CH);
Guenter Karjoth, Waedenswil (CH)

(73) Assignee: International Business Machines Corporation, Armonk, NY (US)

( * ) Notice: Subject to any disclaimer, the term of this patent is extended or adjusted under 35 U.S.C. 154(b) by 817 days.

(21) Appl. No.: 11/957,695

(22) Filed: Dec. 17, 2007

(65) Prior Publication Data

US 2008/0204243 A1 Aug. 28, 2008

(30) Foreign Application Priority Data

Dec. 18, 2006 (EP) .................................. 06126346

(51) Int. Cl.
*G08B 13/14* (2006.01)
(52) U.S. Cl. .................... 340/5.92; 340/572.1; 235/385; 235/375

(58) Field of Classification Search ........ 340/10.1–10.6, 340/572.1, 572.4, 573.1, 5.8, 5.92; 235/375, 235/383–385, 492
See application file for complete search history.

(56) References Cited

U.S. PATENT DOCUMENTS

| | | | | |
|---|---|---|---|---|
| 5,410,688 | A * | 4/1995 | Williams et al. | 1/1 |
| 5,804,810 | A * | 9/1998 | Woolley et al. | 235/492 |
| 6,424,264 | B1 * | 7/2002 | Giraldin et al. | 340/573.1 |
| 7,336,152 | B2 * | 2/2008 | Horwitz et al. | 340/10.1 |
| 7,646,300 | B2 * | 1/2010 | Stewart et al. | 340/572.1 |
| 7,714,697 | B2 * | 5/2010 | Soleimani et al. | 340/10.2 |
| 2002/0017990 | A1 * | 2/2002 | Okamura | 340/572.1 |
| 2004/0046642 | A1 | 3/2004 | Becker | |
| 2004/0047300 | A1 * | 3/2004 | Enomoto et al. | 370/256 |
| 2007/0210923 | A1 * | 9/2007 | Butler et al. | 340/572.8 |

* cited by examiner

*Primary Examiner* — George A Bugg
*Assistant Examiner* — Anne V Lai
(74) *Attorney, Agent, or Firm* — William Stock; Anne Vachon Dougherty

(57) ABSTRACT

The present invention relates to a tag identification system comprising: a plurality of tags, each tag being identifiable by an associated tag identifier, and at least one tag comprising at least one link to at least one other tag in said group.

12 Claims, 3 Drawing Sheets

TAG IDENTIFICATION SYSTEM

FIELD OF THE INVENTION

The present invention relates to a tag identification system and, more particularly to a system for determining group completeness of RFID tags without using external information and/or resources. The present invention also extends to a method for determining group completeness of RFID tags without using external information and/or resources.

BACKGROUND OF THE INVENTION

A variety of methods and systems are known for the tracking of inventory, raw materials, products, or any other items. Accurate locating, tracking and inventorying of the items is a necessity for operations like manufacturing, warehousing, segregation of defective items, assembling, and for a number of similar operations. A desirable feature in such applications is to determine the physical location of the items, to determine the quantity of the specific item, or perform other similar functions, in the shortest possible time.

Electronic Article Surveillance (EAS) systems or Proximity Detection Systems identify the presence of articles using identification means, or tags, placed on/in an article. Such systems are typically used in retail, manufacturing units, packaging department, grocery, library, and the like. Radio frequency identification (RFID) tags and barcode labels are some of the technologies used for EAS systems.

Barcode labels have been used in monitoring inventory. These barcodes are scanned in order to track articles. In order to read the barcode, the barcode label has to come in direct contact with or in close proximity of an optical scanner/reader and therefore cannot be read remotely. Also, barcode labels cannot be used as security devices.

Tags can be broadly classified as read/write and read only. The data stored on read/write tags can be edited, added to, or completely rewritten, but only if the tag is within the range of the reader. The data stored on a read-only tag can be read, but cannot be edited in any manner. Tags used for barcode systems are read-only whereas tags used for RFID are not restricted thereto and may also be electronic read/write devices. The data transmitted by the tag may provide identification or location information, or specifics about the item being tagged, such as price, color, date of purchase, etc. The tag information may be incorporated in accordance with the design of the application or the user's specifications. Information stored in the tag is extracted by electronically interrogating the tag either by physical contact or by remote sensing.

The barcode system suffers from several drawbacks, such as the necessity to have a line of sight, typically several centimeters, between the barcode label/tag and the barcode scanner. Also, items with the printed barcode labels may get damaged due to improper handling making the label or tag unreadable. Barcodes may also suffer from potential problems associated with substandard print quality of barcode labels, which in turn can lead to scanning and reading problems.

RFID tags are attached to items to be monitored. RFID tags are typically small devices that can be embedded in, or attached to, objects for the purpose of identifying the object over a radio channel. RFID tags can be thought of as "digital barcodes", with the advantage that objects tagged with RFID technology can be more easily and more frequently read compared to, for example, barcode labels, thus improving the quality of information on objects in a supply chain or in the inventory of a warehouse.

Each RFID tag has a unique identification number for the item. Depending upon the type of tag, the reader can receive detailed information stored on the tag, for example, in the memory of the tag, or retrieved from a back-end database using the identification number of the tag as the key to that back-end database. An RFID reader can receive data from as many as 100 tags per second. Accordingly, an inventory can be taken in a time of reduced duration compared to previously-proposed identification systems, such as, for example, the barcode system. In RFID systems, human interference in the reading process is reduced and hence the human error involved is also reduced.

The purpose of RFID technology is to tag individual items so that the item can be monitored according to business requirements. The efficiency of RFID technology directly depends on the quantity and accuracy of the tag ID information collected by readers. However, there are some problems associated with the reading of the tags. For example, RFID tags at the outer periphery of a reader's range are typically more difficult to read due to weaker signal strength(s) compared to those tags that are within that periphery. Furthermore, in this case, the signal strength cannot be boosted and/or the signal range is not extendable by virtue of the tag and/or reader having an associated imposed power supply restriction. In general, there are sources of errors such as defective tags, RF-interferences such as in multiple reader environments, RF-noise, RF-absorptive material, limited functionality due to cost pressure, etc. In general, 100% read accuracy cannot be assured.

In many applications, it is desired not only to monitor individual items/products but also to monitor groups of items/products, such as a pallet of goods leaving a distribution center or arriving at a retail outlet. This is addressed by utilizing "Group Tags". Since the ability to read a group tag is not assured the identity of individual tags within a group is lost whenever the corresponding group tag is not readable.

To address this problem, it has been previously-proposed that the information about the group members is stored either in a database or on an additional group tag, which is mounted on the case or pallet containing a collection of similar items that are grouped together. In the case of a back-end database, each tag identifier must point to the group information. Alternatively, the distinct group tag identifier may be used as a key to ascertain that all the items associated with the group are present, the tag identifiers that are read have to be cross checked with that database maintained at the point where the item originated. Without the help of a back-end database, all the details of each individual item in the specified group should be stored on the group tag.

The above discussed techniques, however, suffer from certain drawbacks. First, the database should be accessible by a network connection. Secondly, the group tag constitutes a single point of failure—if the group tag cannot be read due to some damage or defective configuration, all information about the group is lost or may not accessible. In such cases, each individual member of the group would have to be read and identified in order to determine or reconstruct the group. This process is expensive and may even be impossible in some cases.

US Patent No. 2004/0046642A1 titled "Protocol for addressing groups of RFID tags" discloses a method of addressing a group of RFID tags, wherein the group of RFID tags comprises a subset of a plurality of RFID tags capable of being addressed by a tag reader, wherein each of the RFID tags in the plurality of RFID tags has a unique identifier, and wherein the method comprises: inserting a group address into a message, wherein the group address comprises a first set of data elements substantially equal in value to corresponding ones of the data elements in the identifiers of the group of RFID tags, and wherein the group address comprises a second set of data elements representing any value for corresponding ones of the data elements in the identifiers of the group of RFID tags, and transmitting the message to the plurality of RFID tags. This method proves helpful in handling group tags, but lacks counter measurement techniques when the group tags are damaged or disrupted.

Accordingly, it is desirable to provide an improved method and system for tag identification, it being also desirable to determine the group completeness of RFID tags without using a group tag and to successfully resolve problems relating to broken links or missing tags. It is yet further desirable to be able to check whether an RFID tag reader has read all items of a case or pallet, i.e. perform a completeness check, without using a group tag, and, if some tags were not reachable or present, to determine the identifiers of these missing tags, without using information in a back-end database, i.e. off-line operation.

SUMMARY OF THE INVENTION

In accordance with an embodiment of a first aspect of the present invention, there is provided a tag identification system comprising: a group comprising a plurality of tags, each tag in the group being identifiable by an associated tag identifier, and at least one tag in the group comprising at least one link to at least another tag in the group.

Preferably, the at least one link to the at least one other tag comprises at least a tag identifier of the at least one other tag.

Desirably, the tags are RFID tags.

In accordance with an embodiment of a second aspect of the present invention, there is provided a method of tag identification for identifying a missing tag comprising the steps of: forming a group comprising a plurality of tags, each tag in the group being identifiable by an associated tag identifier; configuring at least one tag in the group to store at least one link to at least another tag in the group; reading each of the tags in the group; storing, in a first set, the tag identifiers read in the reading step; storing, in a second set, the links that are read in the reading step; performing a comparison between the first set and the second set; signaling a missing tag if a mismatch is reported between the first set and the second set when the comparison step is performed.

Preferably, in an embodiment of the second aspect of the present invention, the at least one link to the at least another tag comprises at least a tag identifier of the at least another tag.

Desirably, in an embodiment of the second aspect of the present invention, in the configuring step, the at least another tag is randomly chosen out of the tags in the group.

Preferably, in an embodiment of the second aspect of the present invention, the tags are RFID tags.

Preferably, an embodiment of the second aspect of the present invention further comprises the steps of: storing a link to a tag in the group in at least another tag in the group, this being done for all the tags in the group, and signaling the presence of all the tags in the group when no mismatch is reported between the first set and the second set when the comparison step is performed.

Desirably, an embodiment of the second aspect of the present invention further comprises the step of arranging links stored in the tags to form a ring.

Preferably, in an embodiment of the second aspect of the present invention, the ring comprises a unidirectional ring.

Desirably, in an embodiment of the second aspect of the present invention, the ring comprises a bidirectional ring.

Desirably, an embodiment of the second aspect of the present invention further comprises the step of arranging links stored in the tags to form a scale-free network.

Features of one aspect of the invention may be applied to another aspect of the invention and vice versa. Any disclosed embodiment may be combined with one or several of the other embodiments shown and/or described. This is also possible for one or more features of the embodiments.

BRIEF DESCRIPTION OF THE DRAWINGS

The accompanying drawings illustrate the preferred embodiments of the invention and together with the following detailed description serve to explain the principles of the invention

DETAILED DESCRIPTION OF THE INVENTION

A tagging system includes a tag reader and a group G of N tags with identifiers T1, T2 . . . TN. Each tag holds the identification for the item it is attached to and might also serve as an identifier for another chosen tag from the corresponding group of individual items. The method to create a tag identification scheme and to use it for the detection of missing tags, and therefore, items, is as follows:

Creation (Setup-Phase)
  By selecting a link arrangement best suited for a given group of tags, the identifiers of tags within the same group are stored on other tags of that group.

Completeness Check and Determination of Missing Tags:
  The reader maintains two initially empty sets 'X' and 'Y'. For each tag that was read, the reader adds the tag identifier to the set X and all references stored on that tag to set Y. The aforementioned references comprise the tag identifiers of other tags in the same group that are stored in a given tag. These references are hereinafter also referred to as links or reference identifiers.

After the above process has been repeated for all the tags in the group, the sets X and Y are compared. If the sets are not equal, the reader decides that those entries contained in Y but not in X have not been properly read or are missing, respectively. In case a link arrangement has been used where a link to a tag in the group is stored in at least another tag in the group, this being done for all the tags in the group, i.e. a connected graph link arrangement, the reader can decide that all tags of the group have been read if the comparison shows that the two sets are equal.

In the above manner, missing tags are identified in an embodiment of the present invention. There is no need to connect to a back-end database to determine which tags are expected to be read since an embodiment of the present invention is able to identify those tags that have not been read by reading the reference identifiers associated to each tag.

Link arrangements may be based on certain graph types such as rings, random graphs, and scale-free networks, and of different out-degrees, exploiting different properties. For example, randomly created graphs with a comparatively small out-degree are connected with a very high probability. More precisely, if there are N tags, an out-degree of log (N) already gives a connected graph with an increased probability for detection and identification of missing nodes.

Figure 1:
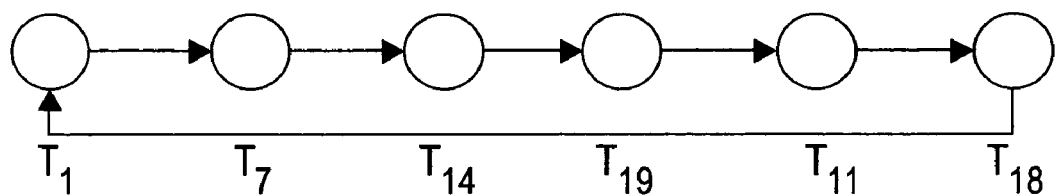
FIG. 1 represents a simple scheme forming a ring; each node has out-degree 1.

FIG. 1 represents an example of a link arrangement that orders tags into a unidirectional ring. In the context of the present invention, a ring arrangement encompasses the scenario where the starting node of the ring, which is T1 in the case of FIG. 1, can be returned to after traversing all the other nodes of the ring. In the example of FIG. 1, each node has out-degree 1, i.e. each tag stores the reference identifier of another tag in the same group. The checking algorithm would work as follows:

In case the RFID tag with tag identifier T11 is not reachable, defunct, or missing, the reader would construct the following two sets:
X={T1, T7, T14, T19, T18}
Y={T7, T14, T19, T11, T1}
Thus, Y−X={T11} indicates the missing tag where set difference is defined by A−B={x:x in A and x not in B}.

The scheme has loss tolerance 1, although in the best case, above linkage would tolerate the loss of three out of the six tags if two or more tags in a row are not missing.

Assuming that a group consists of n tags, tag loss is independent, and q is the loss probability. Thus, without implementation of an embodiment of the present invention, the probability to read all tags of the group is $(1-q)^n$; i.e., already in the case of a single missed tag the group cannot be reconstructed.

With reference being made to FIG. 1, the probabilities to reconstruct a group of 6 nodes with an embodiment of the present invention, hereinafter also referred to as the verification scheme, will be described. In case of a single tag loss, the identity of that tag can always be verified. Thus, the probability to read all tags of the group is $(1-q)^{(n-1)}$. The probability that two tags can be verified, given that they were lost, is 0.6, and the probability that three tags can be verified is 0.2. The verification scheme fails to reconstruct tag losses of 4 and more.

From the above discussion, it can be seen that the probability to read all tags of the group is in the worst case $(1-q)^{(n-1)}$ and, in the best case, $(1-q)^{\lfloor n/2 \rfloor}$. Thus, at least $\lceil n/2 \rceil$ missed tags cannot be reconstructed, where $\lceil x \rceil$ denotes the smallest integer not being lower than x. The probability that the identity of all tags in a group can be reconstructed successfully at the receiver when using a ring scheme with out-degree 1 is given by $$(1-q)^{\lceil \frac{n}{2} \rceil} \cdot \prod_{k=0}^{\lfloor \frac{n}{2} \rfloor - 1} \left(1 - \frac{2k}{n-1} \cdot q\right).$$

Figure 2A:
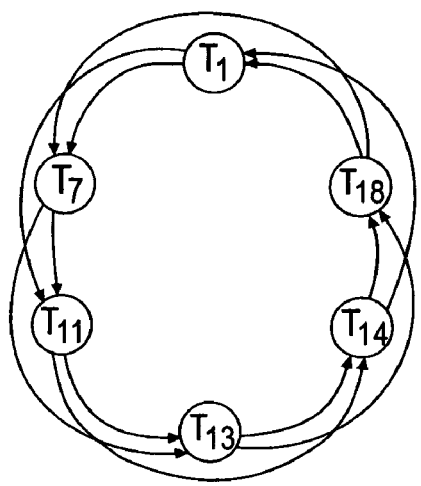
FIG. 2 represents a ring with out-degree 2. It further illustrates how tags of that group can be determined whose tag identifier is not reachable, defunct, or missing according to the present invention.
Figure 2B:
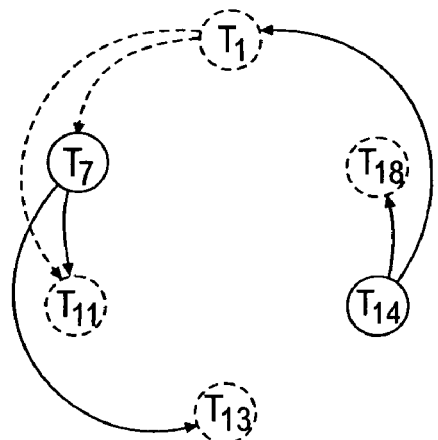

FIG. 2 illustrates a linkage mechanism representing a ring with out-degree 2. In FIG. 2 (a), each node has outgoing links to its next two nodes. This scheme has loss tolerance 2. As shown in FIG. 2 (b), it tolerates a maximal loss of maximal 4 out of 6 nodes.

The table, shown below, illustrates the arrangement made for 5 tags with an out-degree of 3.

| | |
|---|---|
| A | C, D, F |
| B | A, E, C |
| C | B, E, D |
| D | F B, A |
| E | F, C, D |

The content of a tag "A" consists of the information of A along with the identification/link of element C, element D and element F. Tag B consists of information of B along with the identification/link of element A, element E and element C and so on.

Figure 3A:
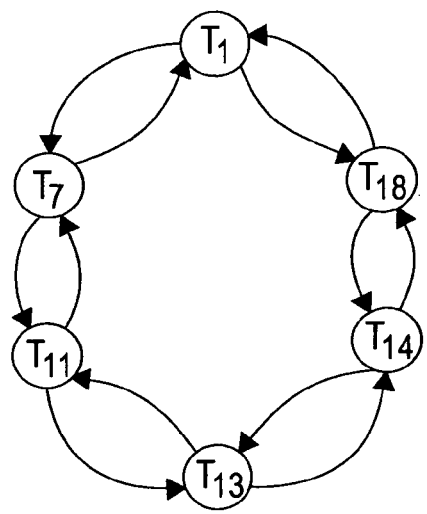
FIG. 3 shows a bidirectional graph, which creates "islands" by adding edges with a reverse-direction.
Figure 3B:
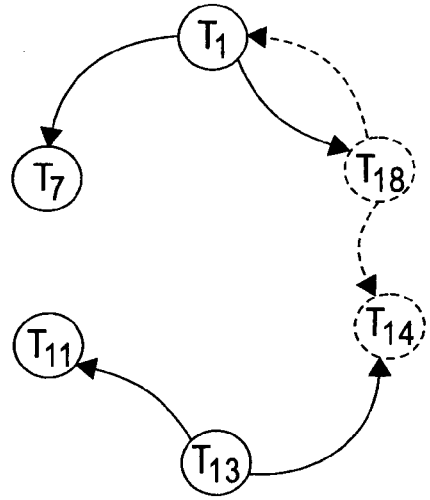

FIG. 3 shows a bi-directional ring arrangement, which creates "islands" by adding edges with a reverse direction. The graph of FIG. 3(a) duplicates the ring of FIG. 1 with reverse orientation. It also tolerates the loss of two subsequent nodes as shown in FIG. 3(b) and may also verify the loss of a fourth node if partitioning of the graph is accepted.

Figure 4:
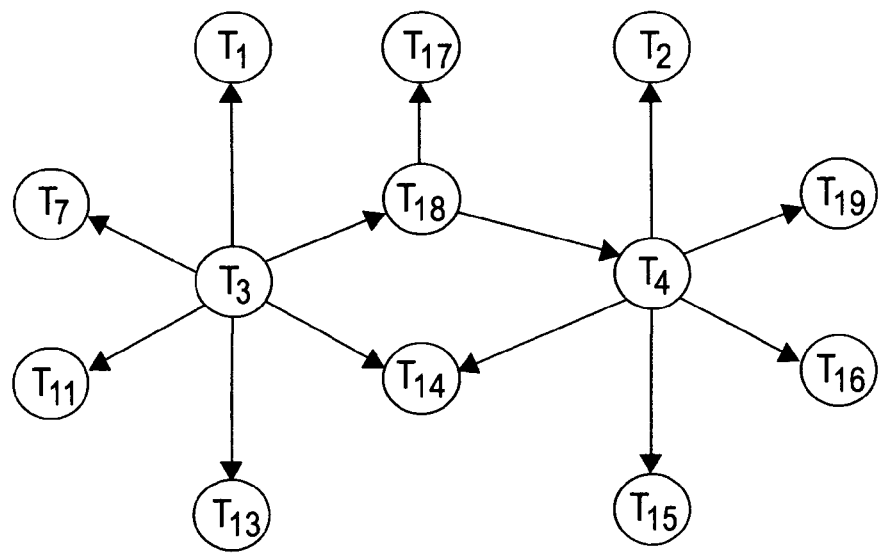
FIG. 4 shows a scale-free network.

In some cases there might be some tags which exhibit better functionality than the others. For example, these tags might have a larger reader distance or they might be able to hold more links. In such cases, graphs containing cliques, or complete graphs, might be of advantage. As shown in FIG. 4, these nodes may be "hub"—nodes with high out-degree—that point to many other tags, preferably those with limited functionality. This applies also when only a subset of tags has additional memory or extended reading distance. As shown in FIG. 4, a scale-free network is a connected graph with the property that the number of links k originating from a given node exhibits a power law distributions $P(k) \sim k^{-Y}$. A scale-free network can be constructed by progressively adding nodes to an existing network and introducing links to existing nodes with preferential attachment so that the probability of linking to a given node i is proportional to the number of existing links $k_i$ that node has, i.e., $$P(\text{linking to node } i) \sim \frac{k_i}{\sum_j k_j}.$$

The scale-free network as shown above has two major hubs that are nodes $T_3$ and $T_4$.

Figure 5:
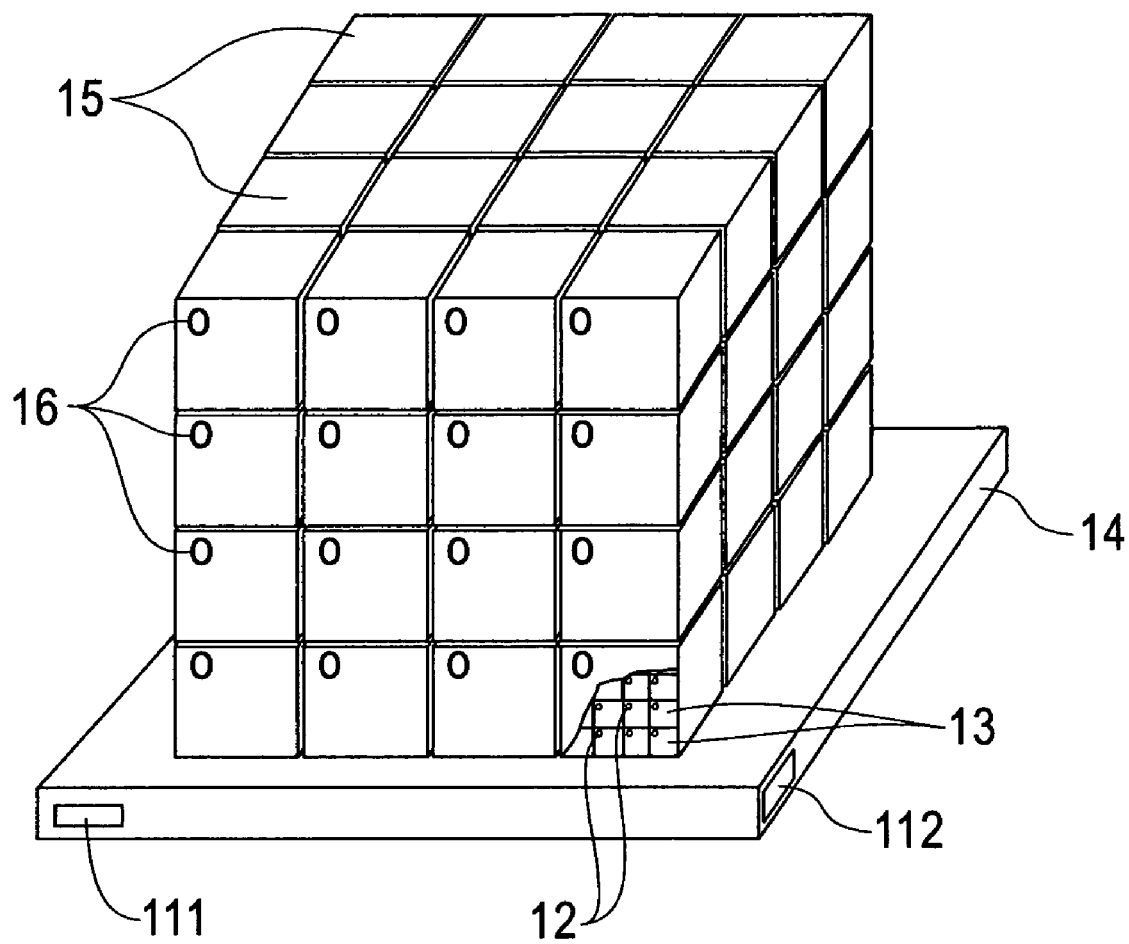
FIG. 5 illustrates an embodiment, which holds a pallet.

FIG. 5 shows a pallet 14 containing a plurality of cases 15. Each case 15 comprises items 13. Each item 13 has a tag identifier 12. Similar item cases 15 are stacked together to form the pallet 14. Cases are stacked together, with each case having a distinct case RFID tag identifier 16. The pallet 14 carries one or more pallet tags 111, 112.

Some tags contain information pertaining to the individual item along with the ID of at least one other RFID tag of its group. The linked tag should be chosen according to a scheme most suitable for the given item case or pallet. The reader scans these additional information-holding tags and gets a set of read identifiers and a set of reference identifiers. The comparison of these two sets can deduce which tags the reader could not read. By increasing the number of references stored on the RFID tags, i.e. the out-degree, the discovery of all the tags in the group can be increased.

The individual tags, including unread tags, in a group can be mapped by reading the tag identifiers and reference identifiers attached thereto. The advantage of this scheme is that the probability to determining unread tags increases with the number of tags in the group.

Examples of the linking arrangements that may be used in an embodiment of the present invention include: items 13 within a case 15; items 13 within a number of cases 15, or all items 13 on the pallet 14. Of course, an embodiment of the present invention is not limited to these particular linking arrangements and any other appropriate linking arrangements may be used therefore.

The present invention has been described above purely by way of example and modifications of detail can be made within the scope of the invention.

Each feature disclosed in the description, and, where appropriate, the claims and the drawings may be provided independently or in any appropriate combination.

The invention claimed is:

1. A distributed tag identification system comprising:
a group comprising a plurality of tags, each tag in said group being identifiable by an associated tag identifier; and
at least one tag in said group comprising at least one link to at least another tag in said group, whereby each tag in said group is linked to at least one other tag in the group;
at least one reading component for reading a first set of tag identifiers and a second set of links; and
a comparison component for comparing the first set to the second set and for identifying a missing tag when said comparing finds a mismatch between the first set and the second set.

2. A tag identification system as claimed in claim 1 wherein said at least one link to said at least another tag comprises at least a tag identifier of said at least another tag.

3. A tag identification system as claimed in claim 1 wherein said tags are RFID tags.

4. A distributed method of tag identification for identifying a missing tag comprising the steps of:
forming a group comprising a plurality of tags, each tag in the group being identifiable by an associated tag identifier;
configuring at least one tag in the group to store at least one link to at least another tag in the group, whereby each tag in said group is linked to at least one other tag in the group;
reading each of the tags in the group;
storing, in a first set, the tag identifiers read in the reading step;
storing, in a second set, the links that are read in the reading step;
performing a comparison between the first set and the second set;
signaling a missing tag if a mismatch is reported between the first set and the second set when the comparison step is performed.

5. A method of tag identification as claimed in claim 4 wherein said at least one link to said at least another tag comprises at least a tag identifier of said at least another tag.

6. A method of tag identification as claimed in claim 4 wherein, in the configuring step, the at least another tag is randomly chosen out of the tags in the group.

7. A method of tag identification as claimed in claim 4 wherein said tags are RFID tags.

8. A method of tag identification as claimed in claim 4 further comprising the steps of:
storing a link to a tag in the group in at least another tag in the group, this being done for all the tags in the group, and
signaling the presence of all the tags in the group when no mismatch is reported between the first set and the second set when the comparison step is performed.

9. A method of tag identification as claimed in claim 4 further comprising the step of arranging links stored in the tags to form a ring.

10. A method of tag identification as claimed in claim 9, wherein the ring comprises a unidirectional ring.

11. A method of tag identification as claimed in claim 9, wherein the ring comprises a bidirectional ring.

12. A method of tag identification as claimed in claim 4 further comprising the step of arranging links stored in the tags to form a scale-free network.

* * * * *